Oct. 29, 1935.  H. ROSE  2,018,900
HEATING APPARATUS FOR AUTOMOTIVE VEHICLES
Filed Sept. 6, 1934  4 Sheets-Sheet 1
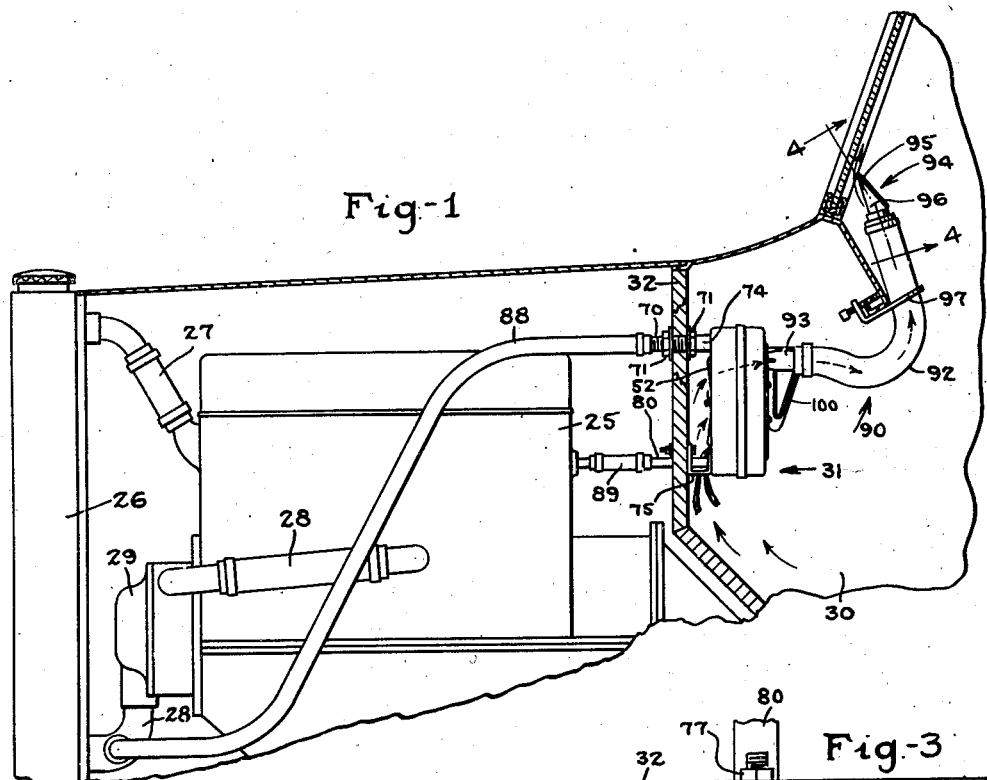
Inventor:
Harry Rose,
By G. H. Braddock
Attorney.

Oct. 29, 1935.  H. ROSE  2,018,900
HEATING APPARATUS FOR AUTOMOTIVE VEHICLES
Filed Sept. 6, 1934  4 Sheets-Sheet 2
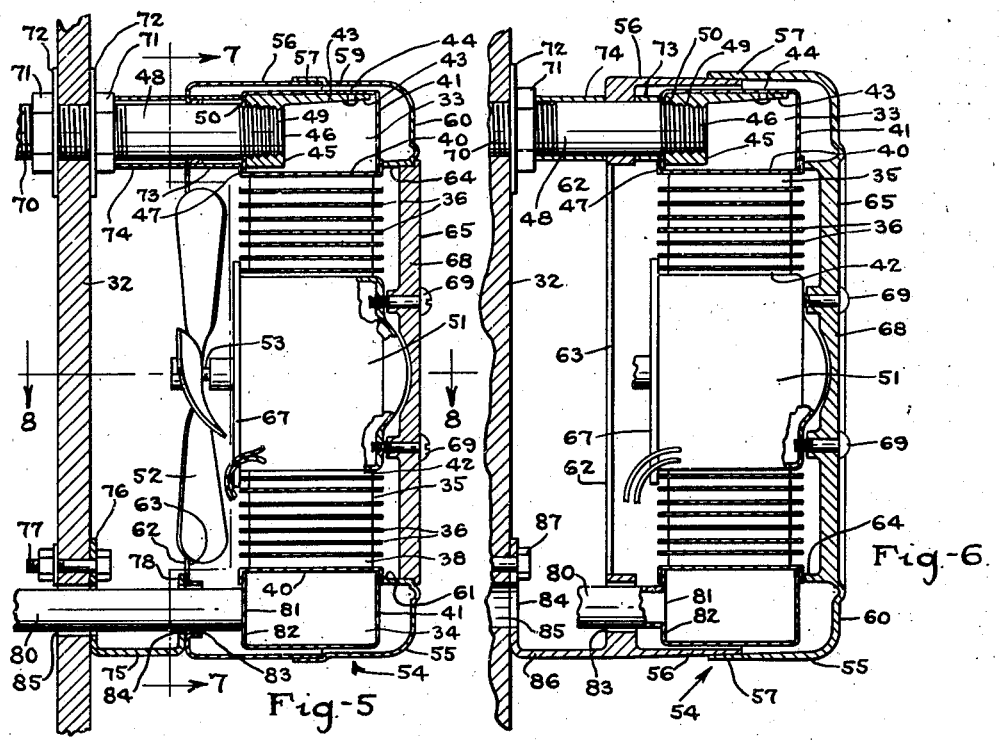
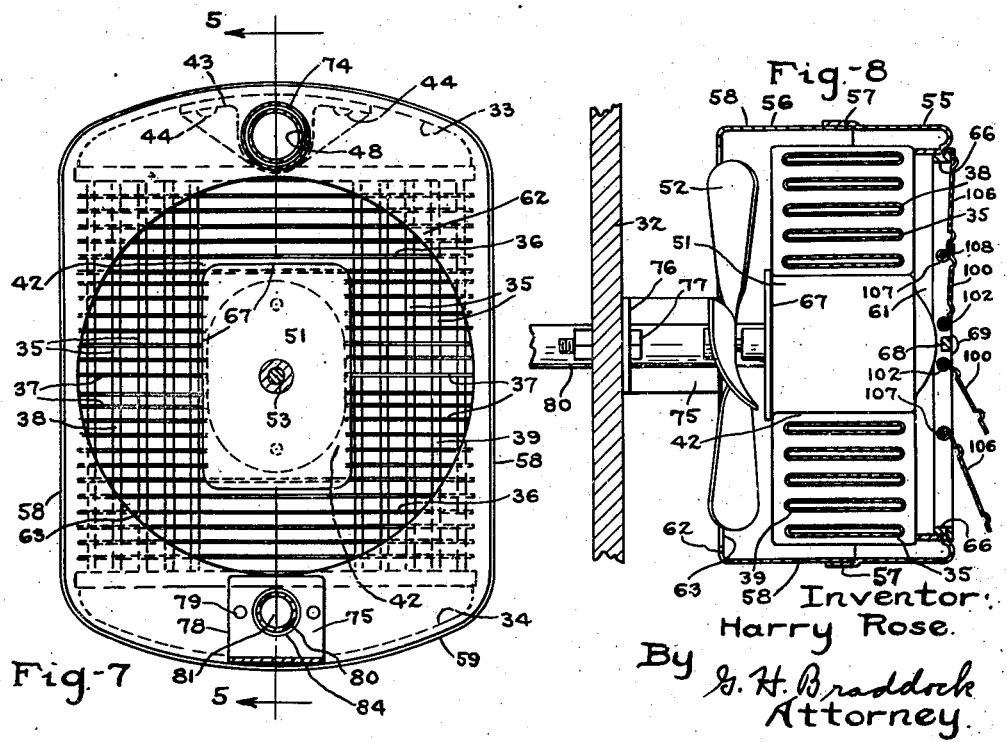
Inventor:
Harry Rose.
By G. H. Braddock
Attorney.

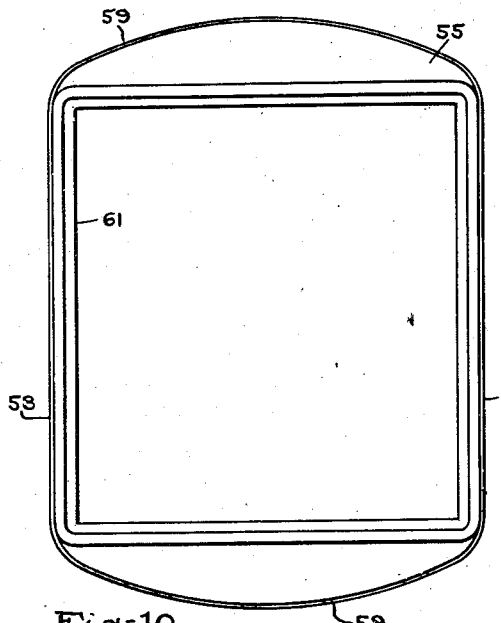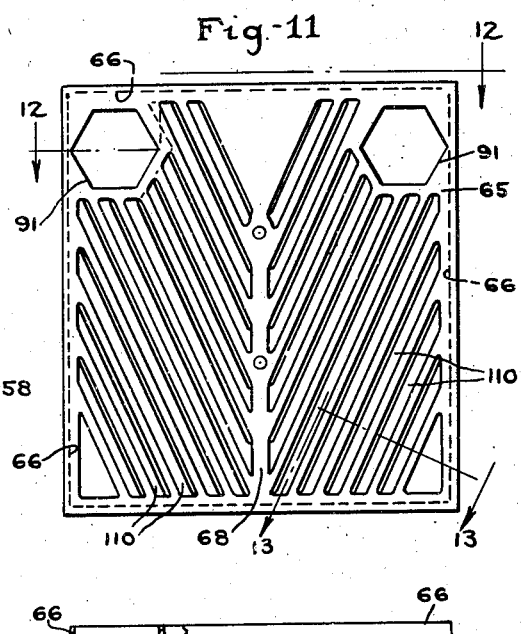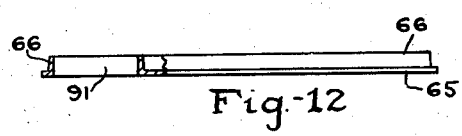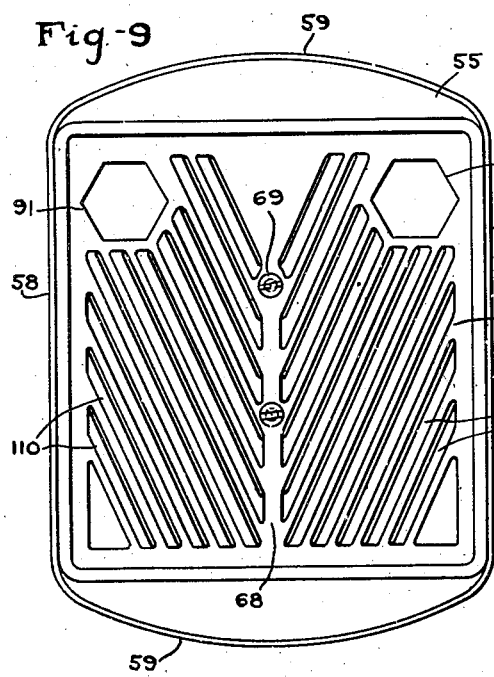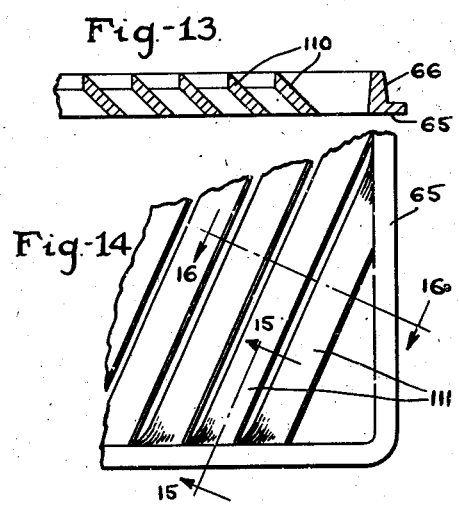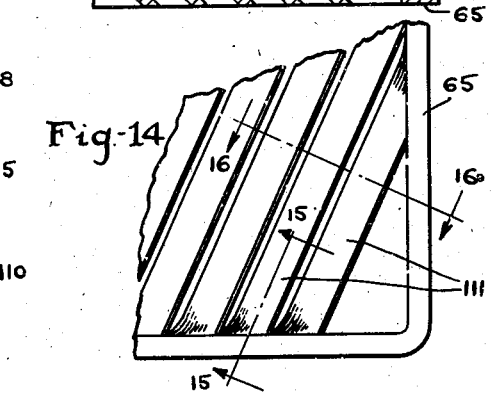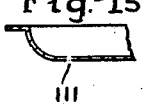

Oct. 29, 1935.  H. ROSE  2,018,900
HEATING APPARATUS FOR AUTOMOTIVE VEHICLES
Filed Sept. 6, 1934  4 Sheets—Sheet 4
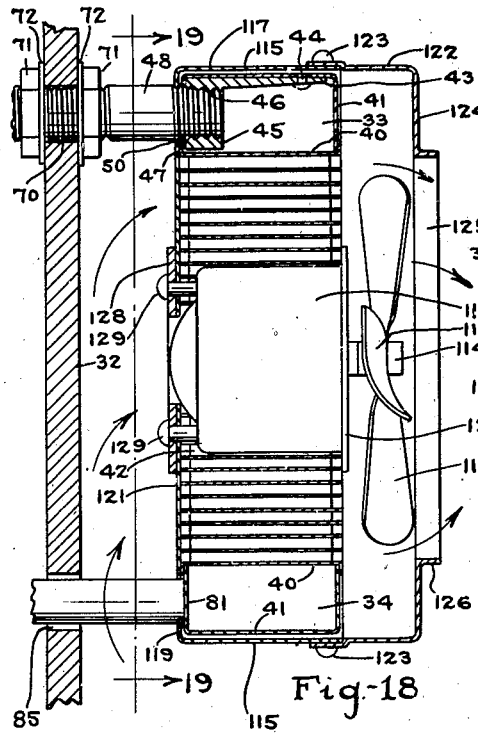
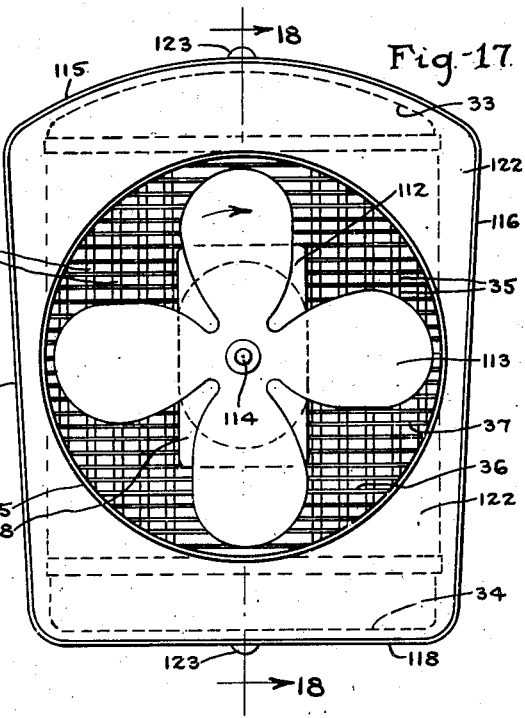
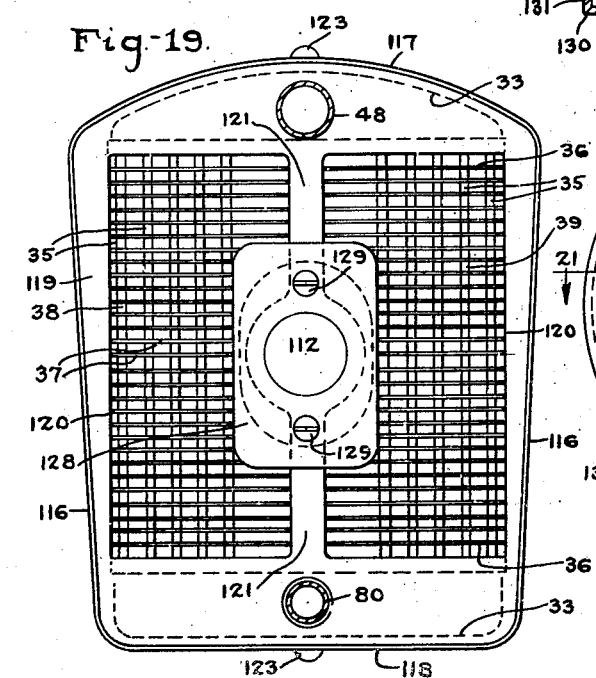
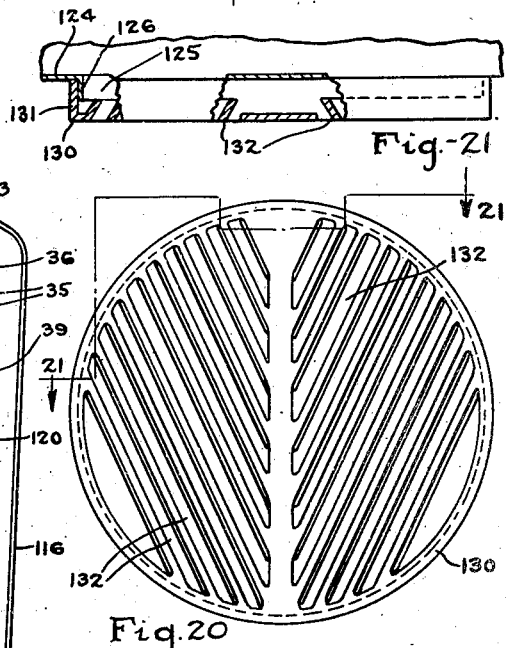
Inventor:
Harry Rose.
By G. H. Braddock
Attorney.

Patented Oct. 29, 1935

2,018,900

UNITED STATES PATENT OFFICE 2,018,900

HEATING APPARATUS FOR AUTOMOTIVE VEHICLES

Harry Rose, Plymouth, Ind.

Application September 6, 1934, Serial No. 742,903

23 Claims. (Cl. 257—137)

This invention has relation to a heater for warming the interior space of an automotive vehicle body, such, for example, as a pleasure automobile, taxicab, bus, or truck, and more particularly relates to an automotive vehicle heating apparatus of the type wherein a part or all of the fluid-cooling or circulating medium for the internal combustion engine of the vehicle is diverted from the fluid-cooling or circulating system and utilized in said heating apparatus as the medium for warming the space to be heated of the automotive vehicle.

An object of the invention is to provide an automotive vehicle heater of the present character which will be of novel and improved construction, and which can be mounted in an automotive vehicle in novel and improved manner.

A further object is to provide an automotive vehicle heater which will be of practical and compact design to occupy but a minimum of space in the interior of the body of an automotive vehicle, and will, at the same time, incorporate features and characteristics of construction adapted to cause the heater to capably and efficiently function at substantially the maximum capacity of heaters of the present general type which occupy considerably more space in automotive vehicle bodies.

A further object is to provide an automotive vehicle heater designed and constructed to be associated with the body of an automotive vehicle in easy, simple, satisfactory and practical manner.

A further object is to provide an automotive vehicle heater so designed and constructed that it can be assembled with the body of an automotive vehicle, adjacent an inner wall or surface of said body, by the employment of a single tubular or pipe support for said heater and a separating bracket or member in spaced relation to said tubular or pipe support and associated with said inner wall or surface.

A further object is to provide a heater of the present character which will include heater supporting structure of simple, novel and improved design.

A further object is to provide an automotive vehicle heating unit having an electric motor mounted within the core thereof in novel and improved manner.

A further object is to provide an automotive vehicle heating unit including a fluid-heated, air-heating core, a motor mounted within said core and adapted to drive a blower or fan situated adjacent the core, and a casing for said core, motor and blower or fan, said heating unit also desirably including, either or both, a grille for the core or heating unit and a shroud for the blower or fan, the whole being associated, assembled and secured together in novel and improved manner.

A further object is to provide a heating unit as just stated, which may include as an integral part of the core thereof, a novel and improved structure for supporting, or for assisting in the support of, said heating unit.

A further object is to provide an automotive vehicle heater of the present character which will include simple and efficient means of novel and improved construction for diverting air blown through the heater, and thus warmed, to desired parts of the interior space to be heated of an automotive vehicle body.

A further object is to provide an automotive vehicle heater which can include interchangeable air diverting or deflecting means as just stated of either stationary or adjustable type.

A further object is to provide in the automotive vehicle heater novel and improved types of air diverters or deflectors, either stationary or adjustable.

A further object is to provide in the heating apparatus, a novel and improved arrangement for conveying warmed air from the heating unit to the windshield or other transparent member of an automotive vehicle, with the end in view of warming or de-frosting said windshield or transparent member.

A further object is to provide an automotive vehicle heater of the type as set forth, which can, when slightly modified, be installed in different parts of an automotive vehicle body, as, for example, upon the dash when the heater is of a certain construction, and upon some other part of the vehicle when the heater is of slightly modified construction.

And a further object is to provide an automotive vehicle heater which can be manufactured at relatively low cost, due to the fact that the heater is of quite simple and inexpensive design.

With the above objects in view, as well as others which will appear as the specification proceeds the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of a heating apparatus having the features of the invention incorporated therein, disclosing said heating apparatus as when applied to use in an automotive vehicle;

Fig. 2 is an enlarged front elevational view of the heating apparatus of Fig. 1 with some adjustable air deflectors removed, and the device for conveying warmed air to the windshield shown in section;

Fig. 3 is a horizontal sectional view, taken as on line 3—3 in Fig. 2;

Fig. 4 is a detail sectional view of the device for conveying warmed air to the windshield, taken on line 4—4 in Fig. 1;

Fig. 5 is a vertical central sectional view, taken as on line 5—5 in Fig. 7;

Fig. 6 is a vertical central sectional view of a modified form of heating apparatus made according to the invention;

Fig. 7 is a vertical sectional view, taken as on line 7—7 in Fig. 5;

Fig. 8 is a horizontal sectional view, taken as on line 8—8 in Fig. 5;

Fig. 9 is a front elevational view of the forward shell of the heating apparatus of Fig. 6;

Fig. 10 is a front elevational view of the heating apparatus casing of Fig. 5 with the core and the grille or air deflector removed;

Fig. 11 is a front elevational view of a grille or air deflector of modified structure which can be assembled with the casing as in Fig. 5 or 10;

Fig. 12 is a detail sectional view taken on line 12—12 in Fig. 11;

Fig. 13 is a detail sectional view, taken on line 13—13 in Fig. 11;

Fig. 14 is an enlarged elevational view disclosing a portion of a grille or air deflector of further modified structure;

Fig. 15 is a detail sectional view, taken on line 15—15 in Fig. 14;

Fig. 16 is a detail sectional view, taken on line 16—16 in Fig. 14;

Fig. 17 is a front elevational view of a further modified form of heating apparatus made according to the invention, the grille or air deflector being omitted;

Fig. 18 is a vertical central sectional view, taken on line 18—18 in Fig. 17;

Fig. 19 is a vertical sectional view, taken as on line 19—19 in Fig. 18;

Fig. 20 is a front elevational view of a grille or air deflector for the heating apparatus of Figs. 17 to 19; and Fig. 21 is a sectional view, taken as on line 21—21 in Fig. 20, detailing a manner of assembling the grille or air deflector of said Fig. 20 with the heating unit of Figs. 17 to 19.

With respect to the drawings and numerals of reference thereon, 25 denotes the engine jacket, 26 the fluid-cooling radiator, 27 the fluid connection from the jacket 25 to the radiator, 28 the fluid connection from said radiator to said jacket, and 29 represents, generally, the usual pump for the fluid-cooling medium of an automotive vehicle 30 of any ordinary or preferred character, such as a pleasure vehicle, taxicab, bus, or truck. Ordinarily, the fluid-cooling medium is circulated by the pump 29 from the jacket 25 through the connection 27 to the radiator 26, and back to the jacket from the radiator through the connection 28.

In Fig. 1 of the drawings, the novel and improved heating unit, designated 31, is mounted within the interior of the automotive vehicle 30, numeral 32 indicating the dash of said vehicle upon which said heating unit is supported in a manner to be fully set forth. As also to be made clear, suitable fluid conveying connections are provided whereby a part or all of the fluid-cooling or circulating medium for the internal combustion engine of said vehicle is diverted and utilized as the medium for supplying heat to said unit 31.

The heating unit 31 includes a fluid-heated, air-heating core consisting of an upper fluid or water tank 33, a lower fluid or water tank 34, a plurality of spaced apart fluid or water tubes, denoted 35, extending between said tanks 33 and 34, and fins, indicated 36 and 37, in spaced relation upon said tubes 35 and extending transversely thereof. The fluid or water tubes 35 are arranged in two spaced apart banks or sets of tubes, represented 38 and 39, respectively. Each tube 35 is relatively flat and wide, said tubes desirably being of slightly less width than the width of the tanks 33 and 34. Said tanks are desirably of equal length and width. The outermost tubes 35 of the different banks or sets of tubes 38 and 39 are arranged adjacent the opposite ends of the tanks, as very clearly disclosed, and all of said tubes 35 are parallely arranged.

Each of the fluid or water tanks 33 and 34 may desirably consist of a header plate 40 into which the adjacent ends of the tubes 35 are suitably fastened in fluid-tight fashion, as by soldering or otherwise, and a housing member 41 suitably fastened, also in fluid-tight fashion, as by soldering or otherwise, to the marginal portions of the corresponding header plate 40, as very clearly shown in Figs. 5, 6 and 18. Each housing member 41 may be of about the configuration illustrated, or of any other preferred shape.

The fins 36, adjacent the opposite end portions of the core, are desirably of relatively small thickness, of width slightly greater than the width of the tubes, which may be of equal width, and of length about equal to the length of each tank. The fins 37, between the two sets of fins 36, are of the same thickness as the fins 36 but are shorter, being in each instance arranged upon the tubes of but a single bank or set of tubes 38 or 39, as the case may be. The forward and rearward edges of the fins 37 desirably terminate flush with the forward and rearward edges of the fins 36, and the outer edges of said fins 37 desirably terminate flush with the outer edges of said fins 36. The inner edges of the fins 37 terminate at the location of the innermost tubes 35 of the different banks or sets of tubes 38 and 39. The innermost fins 36 of the two sets of longer fins are desirably spaced apart a distance somewhat greater than the distance between the innermost tubes 35 of the two banks or sets of tubes 38 and 39, and thus a rectangular space, designated 42, in the core and between the banks or sets of tubes and surrounded by the fins, is provided for a purpose to be made clear.

The tubes 35 of the different banks or sets of tubes are desirably spaced at equal distances from each other, and each of said tubes 35 is desirably perpendicular to each header plate 40, with the widths of the tubes preferably disposed perpendicularly to a plane extending longitudinally and perpendicularly through both header plates.

The fins 36 and 37, respectively, are likewise desirably spaced at equal distances from each other, with the uppermost and lowermost fins 37 being spaced at this same distance from the adjacent longer fins 36, as will be clear from the drawings. Said fins 36 and 37 may be associated with the tubes 35 before said tubes are secured to the header plates, by providing openings through the fins of size to fit the tubes, and sliding said fins over said tubes, or sliding the tubes through the openings in the fins. Preferably, the fins are secured to the tubes, as by soldering or otherwise, to be in intimate heat conveying contact therewith.

When a core constructed as described is completed, it comprises a generally rectilinear article of about the shape as shown in the drawings, said article having opposite end portions thereof, constituted by the housing members 41 of the tanks, constructed along somewhat curvilinear lines.

A supporting structure for the heating unit is adapted to be assembled with a single tubular or pipe support for said unit. The fluid or water tank 33 conveniently carries at the interior thereof a suitable bracket 43, said bracket being riveted or otherwise secured, as at 44, to the upper wall of the upper housing member 41. A downwardly extending flange 45 of the bracket 43 includes a tapped hole 46 adjacent the rearward wall 47 of said upper housing member. A tubular or pipe support 48 has a threaded end portion 49 turned into the tapped hole 46, as disclosed very clearly in the drawings. The tubular or pipe support 48 extends through an opening 50 in said rearward wall 47, and a fluid-tight seal is provided between said opening 50 and the tubular or pipe support, as by soldering or otherwise. The bracket 43 is desirably constructed so as to spread over a considerable area on the inside of the housing member of the upper tank 33, to provide a relatively wide supporting structure for the heating unit. Also, the bracket 43 and the tubular or pipe support 48 are of quite rigid structure, and when said tubular or pipe support is rigidly secured in the rearward wall 47 of the upper housing member 41, as by soldering, said tubular or pipe support is obviously fixed against turning movement in the bracket 43.

Referring more particularly to Figs. 1, 2, 3, 5, 6, 7 and 8, numeral 51 denotes an electric motor within the space 42 of the heating core, said motor having a blower or fan 52 fixed upon the motor shaft 53. The motor is of dimensions to nicely fit into the space 42, and the arrangement is such that the blower or fan 52 will be situated adjacent the core in fairly close relation thereto, about as illustrated in Figs. 1, 3, 5 and 8. When electric power is applied from a source (not shown), such as the battery of an automotive vehicle, to the motor 51, the blower or fan 52 is driven to force air through the core, past and over the fins and tubes thereof.

Still referring to Figs. 1, 2, 3, 5, 6, 7 and 8, a casing 54 is adapted to contain the assembly of the core, motor and blower or fan. Said casing may more or less freely receive said core. As illustrated, the casing is a box-like member consisting of a forward shell 55 and a rearward shell 56, which shells have a telescoping fit, as at 57. The shells 55 and 56 together constitute a casing including straight side walls 58, curvilinear upper and lower end walls 59, and front wall 60 perpendicular to the side and end walls of the casing, with relatively large rectangular cut-away portion or opening 61 of area about equal to, or a little less than, and approximately similar to, the overall area covered by the forward surfaces or edges of the fins 36 and 37. The back of the casing 54, constituted by the rearward shell 56, includes a flange 62 parallel with the front wall 60, said flange 62, together with the adjacent portions of the rearward shell 56, constituting a shroud for the blower or fan 52 and including a circular opening 63 about said blower or fan. The core is inserted in the casing 54 so that said core is situated centrally of the cut-away portion or opening 61 to completely cover said portion or opening.

A grille or air deflector 65 is arranged at the front of the casing 54 to cover the forward area of the fins and tubes. That is to say, to cover the cut-away portion or opening 61. In Figs. 3, 5 and 8, the grille or air deflector 65 is separate from the forward shell 55 of the casing 54. In Figs. 6 and 9 the forward shell is a casting, and the grille or air deflector is integral with said forward shell. The grille or air deflector 65 as shown in Fig. 5 may include either stationary or adjustable bars or louvers. The bars or louvers of the grille or deflector of Figs. 6 and 9 are stationary. Several different types of grilles or air deflectors are hereinafter described. Suffice it to say at this time that the grille or air deflector 65 as in Figs. 3, 5 and 8 includes a rectangular flange 66 adapted to be closely fitted into the opening 61 in the front wall 60 of the forward shell 55 of the casing.

As shown in Figs. 3, 5, 6 and 8, the motor 51 includes a peripheral flange 67 which is located adjacent the blower or fan. The center strip 68 of the grille or air deflector 65 has openings therein to receive spaced apart screw bolts 69, as shown very clearly in Figs. 2, 5, 6 and 8, which screw bolts are adapted to be turned home into the adjacent surfaces of said motor, that is, those surfaces opposite the blower or fan 52. When said screw bolts 69 are so turned home, the peripheral flange 67 and the rectangular flange 64 are drawn up tightly against opposite surfaces of the core, both when the forward shell 55 and the grille or air deflector 65 are separate as in Fig. 5, and when said forward shell and grille or air deflector are integral as in Fig. 6, and the grille or air deflector, forward shell, core and motor with fan are held in fixed relation.

In Figs. 1 to 8, the tubular or pipe support 48 constitutes cooperating means through the instrumentality of which the heating unit can be mounted upon a fixed part of an automotive vehicle body. As disclosed very clearly in Figs. 1, 5 and 6, the outer portion 70 of the tubular or pipe support 48 is externally threaded and passes through a hole in the dash 32 of the automotive vehicle, said hole closely fitting upon the tubular or pipe support. Said tubular or pipe support is rigidly secured in the dash of the vehicle by adjustable supporting nuts 71 upon the tubular or pipe support, there being one nut at each side of the dash, each of which nuts can be turned up against a washer 72 between the nut and the dash. The tubular or pipe support 48 passes through an opening in the flange 62, and a spacing sleeve 73 upon said tubular or pipe support 48 has one of its ends engaging the rearward surface of the upper housing member 41 of the core and its other end engaging said flange 62. A second spacing sleeve 74 upon the tubular or pipe support 48 has one of its ends engaging the flange 62 and its other end engaging the adjacent supporting nut 71. It will be evident that the supporting nuts 71 can be adjusted to situate the tubular or pipe support in the vehicle dash 32 so that the spacing sleeves 73 and 74 fix the relation of the rearward shell 56 to the forward shell 55 of the casing. The arrangement as described makes provision for the rigid securing of the core and its casing, with appurtenances, upon the automotive vehicle body, interiorly thereof. The weight of the grille or air deflector, the forward and rearward shells of the casing, the shroud, the motor and the blower or fan are made rigid with the core, which, so to speak, carries said weight back to the tubular or pipe support 48.

Referring to Figs. 1, 3, 5, 7 and 8, numeral 75 denotes a bracket or member cooperating with the tubular or pipe support to fixedly attach the heating unit to the dash 32. As there shown, said bracket or member 75 is of U-shape, including a leg 76 bolted to the dash, as at 77, and a leg 78 riveted to the flange 62, as at 79, at location spaced from the tubular or pipe support 48. A tube or pipe 80 is secured in fluid-tight fashion, as by soldering or otherwise, in an opening 81 in the rearward wall 82 of the lower fluid or water tank 34, and said tube or pipe 80, as well as the tubular or pipe support 48, extends away from the core and out of the casing 42. An opening 83 in the flange 62, openings 84 in the legs of the U-member 75, and an opening 85 in the dash allow passage of the tube or pipe 80.

In Fig. 6 a bracket 86, equivalent to the bracket 75, and for the same purpose, is integral with the rearward shell 56 and is bolted to the dash 32, as at 87. Openings 83, 84, and 85 in the flange 62, the bracket 86 and the dash 32 allow passage of the tube or pipe 80.

While the forward and rearward shells of the casing of Fig. 5 may desirably be composed of sheet metal, the forward and rearward shells of the casing of Fig. 6 are castings, and the bracket 86 is cast integral with the rearward shell of said Fig. 6.

Evidently, the arrangement as illustrated in Figs. 1 to 8, and as before described, permanently retains the grille or air deflector, the forward and rearward shells of the casing, the shroud integral with said rearward shell of the casing, the core, and the motor with blower or fan in the proper and desired fixed relation to each other. Thus, all of the weight of the heating unit is carried back to the tubular or pipe support 48 through the instrumentality of the heating unit core with which said tubular or pipe support is directly associated. The brackets or members, such as 75 or 86, cooperate with the tubular or pipe support 48 to additionally insure stability of the lower portion of the heating unit.

A fluid or water connection 88 extends from the tubular or pipe support 48 to the connection 28, at location in front of the pump 29, and a fluid or water connection 89 extends from the engine jacket 25 to the tube or pipe 80.

When the internal combustion engine of the automotive vehicle 30 is operating, there will be a substantial flow of hot fluid or water from the jacket 25 through the connection 89 and the tube or pipe 80 to the core of the heating unit, and back to said jacket 25 through the tubular or pipe support 48, the connection 88, the connection 28 and the pump 29. Any other suitable and preferred arrangement for circulating all or any desired portion of the hot fluid or water of the engine cooling system through the core of the heating unit can be substituted for the arrangement disclosed. As illustrated, the flow through the heating unit core is upward. The flow could of course be downward, the hot fluid or water in such an event passing through a suitable connection attached to the tubular or pipe support 48 to here enter the core, and leaving said core by way of the tube or pipe 80 and a suitable connection attached thereto. The hot fluid or water upon entering the tube or pipe 80 passes into the lower fluid or water tank 34. Thence hot fluid or water passes upwardly through each of the relatively flat and wide tubes 35 to the upper fluid or water tank 33. And from the tank 33, the hot fluid or water passes out of the heating unit through the tubular or pipe support 48. While traveling through the tubes 35, the hot fluid or water gives off heat which is absorbed by the fins 36 and 37, and, by rotation of the blower or fan 52 to force air past and over the fins or tubes, the air is caused to be heated and distributed throughout the vehicle body.

By reason of the provision of the separate banks or sets of relatively flat and wide tubes 35, the hot fluid or water is caused to be circulated through the portion of the core of the heating unit over which the circulated air travels at high velocity. The hot fluid or water thus retains its heat and causes the average temperature of the heating unit to be elevated, so that the heater functions capably and efficiently at substantially the maximum capacity of heaters of the present general type which occupy considerably more space in automotive vehicle bodies.

It will be evident that by slight modification, the hot fluid or water could be circulated through the heating core by passing upwardly through the tubes of one of the banks or sets of tubes and downwardly through the tubes of the other bank or set of tubes. In such an event, the entrance and egress of hot fluid or water would be to and from the same tank, such as 33 or 34, and there would be a partition in this tank effectually separating the adjacent ends of the different banks or sets of tubes.

In Figs. 1, 2, 3, 5, 7 and 8, the grille or air deflector 65 is of adjustable type, and includes means for associating the device, represented 90, adapted to convey warmed air to the windshield or other transparent member of the automotive vehicle, with the heating unit. Said grille or air deflector 65 has a pair of separate hexagonal openings 91 therethrough and in alinement with the air passageways through the heating core, each of which openings in capable of receiving the device 90. Said device consists of a flexible tube 92 having a desirably split coupling member 93 which can be removably fitted to either hexagonal opening 91, and an air distributing member 94 including an obliquely extending air spreader 95 and flaring air directors 96. The arrangement is such that the air spreader 95 directs the air toward the windshield and the air directors 96 cooperate with the air spreader 95 to cause the air to travel over a preferred area of said windshield. A clip 97 may be employed to support the air distributing member adjacent the windshield. The blower or fan forces warmed air through the core of the heater and into the device 90, which conveys the hot air into contacting engagement with the windshield or other member to be de-frosted. The tube 92 being flexible, the device 90 can be applied to any desired part of the windshield.

Said grille or air deflector of Figs. 1, 2, 3, 5, 7 and 8 includes vertically disposed bearings, indicated 98 and 99, at each side of the central strip 68, and a triangular shaped louver 100 is hingedly supported, as at 101, upon each set of bearings 98, 99. As disclosed, each set of bearings 98, 99 supports a vertical shaft 102 upon which a louver 100 is fixed, and a coil spring 103 upon each shaft 102 and between the louver 100 and its lower bearing surface insures that each of said louvers 100 will remain at any adjusted position to which set, as will be understood. The triangular louvers 100 are adapted to together cover a portion of the opening 61 at the upper location of said opening and at either side of the center strip 68. Said louvers 100 are also adapted to cover the hexagonal openings 91. The grill or air deflector additionally includes obliquely disposed bearings 104 and 105, at the outer, oblique edge of each triangular louver 100 when in closed position, and a triangular shaped louver 106 is hingedly supported, as at 107, upon each set of bearings 104, 105. As disclosed, each set of bearings 104, 105 supports an oblique shaft 108 upon which a louver 106 is fixed, and a coil spring 109 upon each shaft 108 and between the louver 106 and its lower bearing surface insures that each of said louvers 106 will remain at any adjusted position to which set. The triangular louvers 106 cover all of the remainder of the opening 61 not covered by the triangular louvers 100. The oblique outer edge portions of the louvers 100 slightly overlap the oblique inner edge portions of the louvers 106, and the vertical outer edge portions of the said louvers 106 slightly overlap the side frame members of the grille or air deflector 65, as shown very clearly in Figs. 2, 3 and 8, when in closed position. Thus said louvers 100 and 106 effectually preclude the passage of air through the heating unit when the louvers are closed. Obviously, each louver 100, 100, 106, 106 is separately adjustable upon its hinge, and the louvers can be set to deflect air passing through the heating unit in any preferred direction. And the louvers can be set to permit the passage of any amount of air from the heating unit. That is, some louvers can be closed, some partially open, and some fully open at one and the same time, depending upon preference. Clearly, when the device 90 is inserted in either hexagonal opening 91, the louver 100 for this opening is swung to open position, as in Figs. 1 and 3, and devices 90 can be positioned in both openings 91, as when it is desired to concurrently warm two separate locations upon a windshield or other member.

While louvers 100 and 106 of specific structure and bearing certain relation to each other have been described, it will be evident that the details of the louver structure and arrangement can be varied. For example, a greater or less number of louvers can be employed, and each louver can control a portion of the opening 61 different from the particular portion as illustrated in the drawings.

Fig. 9 discloses a front elevational view of the forward shell 55 of Fig. 6, said forward shell being a casting. Fig. 10 is a front elevational view of a heating apparatus forward shell as in Fig. 5, which is constituted either as a casting or as sheet metal, and Fig. 11 discloses a grille or air deflector to fit the shell of Fig. 10, said grille or air deflector of Fig. 11 being constituted as a casting. In Figs. 9 and 11, the grille or air deflector 65 includes a pair of sets of stationary bars or louvers 110 arranged at the opposite sides of the center strip 68, which bars or louvers are as disclosed situated obliquely to extend downwardly and toward said center strip, and are arranged at an angle, as shown in Fig. 13, to deflect the air toward each side of the heating unit, and hence toward opposite sides of an automotive vehicle in which said heating unit may be situated. That is, there are two divergent sets of air currents, and the air is deflected downwardly as well as outwardly. The construction described provides a fixed or stationary type of deflector for the heating unit which will satisfactorily accomplish proper distribution of the air at small cost for the deflector. In Figs. 11 and 12 it will be seen that the hexagonal openings 91 in a stationary deflector may be constructed in about the same manner as when an adjustable deflector is employed.

Fig. 14 discloses a grille or air deflector made of sheet metal and including stationary bars or louvers 111 situated obliquely. Said bars or louvers 111 are arranged at an angle, as best disclosed in Figs. 15 and 16, to deflect air toward a side of the heating unit and downwardly. The air deflecting arrangement as in Figs. 14 to 16 can of course be about the same as in Figs. 9, 11 and 13. That is, bars or louvers 111 can be arranged at the opposite sides of a center strip, such as 68, of a grille or air deflector, to extend downwardly and toward said center strip.

Referring more particularly to Figs. 17 to 21, numeral 112 denotes an electric motor within the space 42 of the heating core, said motor having a blower or fan 113 fixed upon the motor shaft 114. The motor 112 is of dimensions to nicely fit into the space 42, and the arrangement is such that the blower or fan 113 will be situated adjacent the core as shown in Fig. 18, said blower or fan 113 being at the side of the core opposite the side at which the blower or fan 52 is situated. When electric power is applied from a source (not shown), such as a battery of an automotive vehicle, to the motor 112, the blower or fan is driven in the direction denoted by the arrow in Fig. 17 to pull air through the core as disclosed by the arrows in Fig. 18, past and over the fins and tubes of said core.

Still referring to Figs. 17 to 21, a casing 115 is adapted to contain the assembly of the core, motor and blower or fan. Said casing 115 may more or less freely receive said core. As illustrated, the casing is a box-like member including straight side walls 116, curvilinear upper end wall 117, relatively straight lower end wall 118, and rear wall 119 perpendicular to the side and end walls of the casing, with relatively large rectangular cut-away portion or opening 120 of area about equal to, or little less than, and approximately similar to, the overall area covered by the rearward surfaces or edges of the fins 36 and 37. Said rear wall 119 includes an integral center strip 121 which extends vertically across the midwidth of the rectangular opening 120. The front of the casing 115 supports a cover or shroud 122 for the blower or fan 113, the inner portion of said cover or shroud being in telescoping relation to the front of the casing, and the cover or shroud and the casing being bolted or riveted to each other as at 123. The cover or shroud 122 includes an inwardly extending flange 124 parallel with the rear wall 119, and said flange 124 includes a circular opening 125 about the blower or fan 113. The core is inserted in the casing 115 so that said core is situated centrally of the cut-away portion or opening 120 to completely cover said portion or opening, and so that the blower or fan is adjacent the circular opening 125, in alinement therewith. Said opening 125 is defined by an annular flange 126 extending forwardly from the flange 124 of the cover or shroud 122.

As disclosed very clearly in Fig. 18, the motor 112 includes a peripheral flange 127 which is located adjacent the blower or fan 113. Numeral 128 denotes a reinforcing strip or plate arranged against the outer or rearward surface of the center strip 121, at the midlength of said center strip. Said reinforcing strip or plate 128 and said center strip 121 have alining openings therein to receive spaced apart screw bolts 128, as disclosed in Figs. 18 and 19, which screw bolts are adapted to be turned home into the adjacent surfaces of said motor 112; that is, those surfaces opposite the blower or fan 113. When said screw bolts 129 are so turned home, the pheripheral flange 127 and the center strip 121 are drawn up tightly against opposite surfaces of the core, and the casing, core, cover or shroud and motor with blower or fan are held in fixed relation.

A circular grille or air deflector 130 is arranged at the front of the cover or shroud 122, and is suitably fitted to the annular flange 126 over the circular opening 125. As shown very clearly in Fig. 21, said grille or air deflector 130 includes an annular flange 131 fitted over the annular flange 126. Additional means (not shown) may be provided for fastening the grille or air deflector 130 to the cover or shroud 122. Said grille or air deflector 130 may be constituted as a casting, or may be sheet metal. As shown, it includes a pair of sets of stationary bars or louvers 132 arranged at the opposite sides of a vertical center line of the grille or air deflector, which bar or louvers are situated obliquely to extend downwardly and toward said center line, and are arranged at an angle, as will be clear from Fig. 21, to deflect the air toward each side of the heating unit and downwardly.

In Figs. 18 and 19, the tubular or pipe support 48 constitutes means through the instrumentality of which the heating unit can be mounted upon an automotive vehicle body. The outer portion 70 of the tubular or pipe support is externally threaded and passes through a hole in the dash 32, said hole closely fitting upon the tubular or pipe support. Adjustable supporting nuts 71 upon the tubular or pipe support rigidly secure it in the dash. One nut 71 is arranged at each side of the dash, and each nut is turned up against a washer 72 between the nut and the dash. The tubular or pipe support 48 passes through an opening in the rear wall 119. The arrangement as described rigidly secures the core and its casing, with appurtenances, at the interior of the automotive vehicle body. The weight of the grille or air deflector, the casing, the shroud, the motor and the blower or fan are made rigid with the core, and said core carries said weight back to the tubular or pipe support 48, as stated in connection with Figs. 1 to 8. The tube or pipe 80 passes freely through the opening 85 in the dash 32 and through an opening in the rear wall 119.

The heating core of Figs. 17, 18 and 19 can be connected up with an automotive vehicle cooling system in the manner as hereinbefore set forth, or in any other suitable and desired manner. While traveling through the tubes 35, the hot fluid or water gives off heat to the fins 36 and 37, and, by rotation of the blower or fan 113 to pull air past and over the fins and tubes, the air is heated and distributed in the vehicle body.

As hereinbefore set forth, the hot fluid or water can, by slight modification, be circulated through the heating core by passing upwardly through the tubes of one bank or set of tubes and downwardly through the tubes of the other bank or set of tubes.

What is claimed is:

1. An automotive vehicle heater comprising a fluid-heated, air-heating core, an electric motor in said core, a fan fixed to the shaft of said motor and arranged without the core to circulate air into contact with said core, a heater supporting structure rigidly carried by said core at the interior thereof, a pipe support for said heater rigidly secured to said supporting structure and extending out of said core, said pipe support constituting a passageway for fluid traveling through said core, means for securing said pipe support to a fixed part of an automotive vehicle, a bracket member in spaced relation to said pipe support rigid with said core, and means for securing said bracket member to said fixed part.

2. In an automotive vehicle heating unit, the combination with a core consisting of spaced apart fluid receiving tanks, a plurality of spaced apart fluid carrying tubes communicating with said tanks and comprising spaced apart banks of fluid carrying tubes extending from one of said fluid receiving tanks to the other, and heat absorbing fins upon said tubes and extending transversely thereof, of an electric motor mounted in said core between said banks of tubes and adjacent to said fins, a fan fixed to the shaft of said motor and arranged outside said core to circulate air past and over said tubes and between and over said fins, a heating unit supporting structure carried at the interior of said core, a support for the heating unit rigidly secured to said supporting structure, means for securing said support upon a fixed part of an automotive vehicle, a stabilizer for the heating unit in spaced relation to said support, and means for securing said stabilizer to said fixed part.

3. An automotive vehicle heating unit comprising a fluid-heated, air-heating core, a fan adjacent said core, a motor mounted in said core and adapted to drive said fan, a casing with grille and shroud for said core, motor and fan, said casing consisting of complemental forward and rearward shells, means engaging said grille and said motor for securing the motor in the core and the forward shell to said core, a supporting structure for the heating unit, and means engaging said supporting structure, said rearward shell and said core for securing the rearward shell in fixed relation to the forward shell and the core.

4. An automotive vehicle heating unit comprising a fluid-heated, air-heating core, a motor mounted in said core and adapted to drive a fan situated adjacent the core, a casing including grille and shroud for said core, motor and fan, said casing consisting of complemental forward and rearward shells, means engaging said grille and said motor for securing the motor in the core and the forward shell with grille to said core, a supporting structure rigidly carried by the core at the interior thereof, a pipe support for the heating unit rigidly secured to said supporting structure and extending out of said core, said pipe support constituting a passageway for fluid traveling through said core, means for rigidly securing said pipe support to a fixed part of an automotive vehicle, and means upon said pipe support between said fixed part and said rearward shell and between said rearward shell and said core for securing the rearward shell in fixed relation to the forward shell and the core.

5. The combination as specified in claim 4, a bracket member in spaced relation to said pipe support rigid with said rearward shell, and means for securing said bracket member to said fixed part.

6. In an automotive vehicle heating unit, the combination with a core including a fluid receiving tank, a supporting structure for said heating unit carried at the interior of said core, a support for said heating unit secured to said supporting structure, a box-like casing including forward and rearward shells in telescoped relation, a shroud integral with said rearward shell and carried by said support, a grille carried by said forward shell, and means upon said support for fixing the relation of said shells to each other, of an electric motor in said core, a fan adjacent said support and opposite said grille driven by said motor, and means attaching said motor, said forward shell and said grille to said core.

7. In an automotive vehicle heating unit, the combination with a core including a fluid receiving tank, a supporting structure for said heating unit carried at the interior of said tank, a pipe support for said heating unit secured to said supporting structure, a box-like casing including forward and rearward shells surrounding said core, a shroud integral with said rearward shell and arranged upon said pipe support, a grille carried by said forward shell, means for securing said pipe support to a fixed part of an automotive vehicle, and spacing sleeves upon said pipe support between said fixed part and said shroud and between said shroud and said core for fixing the relation of said forward and rearward shells to each other, of an electric motor in said core, a fan driven by said motor, and means fixing the relation of said motor, said forward shell and said grille to said core.

8. The combination as specified in claim 7, a stabilizer for the heating unit in spaced relation to said pipe support and secured to said rearward shell, and means for attaching said stabilizer to said fixed part.

9. An automotive vehicle heater comprising an air heating core, a casing for said core including interfitting forward and rearward shells, a shroud associated with said rearward shell, a grille associated with said forward shell, a supporting structure for the heater arranged within the interior of said core, a pipe support secured to said supporting structure, means for securing said pipe support to a fixed part of an automotive vehicle, a motor within said core, a fan carried by the motor shaft and adapted to cause air to circulate past said core, means for attaching said motor and said grille to each other to fasten the forward shell, the grille and the motor in fixed relation to the core, and means upon said pipe support for fastening the rearward shell in fixed relation to the forward shell.

10. The combination as specified in claim 9, a bracket member secured to said rearward shell, and means for attaching said bracket member to said fixed part.

11. An automotive vehicle heater comprising an air heating core, a casing for said core, a cover member secured to said casing and providing a shroud, a motor within said core, a fan upon the motor shaft adjacent the shroud, a motor supporting member upon said casing and opposite said fan, and means for securing said motor to said motor supporting member to fix said casing with shroud and said motor relatively to said core.

12. An automotive vehicle heater comprising an air heating core, a casing for said core, a cover member secured to said casing and providing a shroud, a grille upon said shroud, a motor within said core, a fan upon the motor shaft adjacent the shroud, a motor supporting member integral with said casing and opposite said fan, means for securing said motor to said motor supporting member to thus clamp said core to said casing, a supporting structure for the heater within said core, and a pipe support secured to said heater supporting structure.

13. An automotive vehicle heater comprising an air heating core, a supporting structure for the heater within said core, a pipe support secured to said supporting structure, means for securing said pipe support to a fixed part of an automotive vehicle, a casing housing said core, a cover member upon the casing and providing a shroud, a motor within said core, a fan upon the motor shaft within said shroud, motor supporting means secured to the casing and located at the side of the motor opposite the fan, a flange upon said motor and adjacent said fan, and means for clamping said core between said motor supporting means and said flange, whereby to fasten said core, said motor with fan, and said casing with shroud in fixed relation to each other.

14. An automotive vehicle heater comprising an air heating core, a casing for said core, a cover member secured to said casing and providing a shroud, a motor within said core, a fan upon the motor shaft adjacent the shroud, a motor supporting member upon said casing and opposite said fan, means for securing said motor to said motor supporting casing to thus clamp said core to said casing, a supporting structure for the heater within said core, and a pipe support secured to said heater supporting structure.

15. An automotive vehicle heater comprising an air heating core, a supporting structure for the heater within said core, a pipe support secured to said supporting structure, means for securing said pipe support to a fixed part of an automotive vehicle, a casing housing said core, a cover member upon the casing and providing a shroud, a motor within said core, a fan upon the motor shaft adjacent said shroud, motor supporting means secured to the casing, and means for fastening said core to said motor supporting means.

16. An automotive vehicle heater comprising an air heating core, a supporting structure for the heater within said core, a pipe support secured to said supporting structure, means for securing said pipe support to a fixed part of an automotive vehicle, a casing housing said core, a cover member upon the casing and providing a shroud, a motor within said core, a fan upon the motor shaft adjacent said shroud, motor supporting means secured to the casing, a motor locating element associated with said motor, and means for fastening said core between said motor supporting means and said element.

17. In an automotive vehicle heater, a heating core having air passageways therethrough, means for circulating air through said passageways, and a stationarily positioned warm air deflecting member at one end of said passageways, said deflecting member including a set of obliquely arranged slots with angularly situated louver adjacent each slot at each side of an approximately vertical air arresting strip of the member for causing warm air emanating from said air passageways to travel away from the heating core as divergent and downwardly directed sets of air currents.

18. In an automotive vehicle heater, a deflector including an approximately vertical air arresting strip disposed centrally across the heater, and slotted portions at either side of said strip, said slotted portions inclining downwardly and inwardly and terminating at their lower ends adjacent said strip, and an angularly situated louver at the inner side of each slot for causing air emanating from the heater to travel as divergent and downwardly directed sets of air currents.

19. An air deflector for a vehicle heater, including louvers pivotally and separately mounted upon vertically disposed bearings supported by said heater, and louvers pivotally and separately mounted upon obliquely disposed bearings supported by said heater, each of said louvers being independently adjustable.

20. An air deflector for a vehicle heater, including louvers pivotally and separately mounted upon vertically disposed bearings supported by said heater, and louvers pivotally and separately mounted upon obliquely disposed bearings supported by said heater, each of said louvers being independently adjustable, and means for insuring that each louver will remain at any adjusted position to which set.

21. In an automotive vehicle heater, a heating element having an open front, and an air deflector for covering said open front, said air deflector including louvers pivotally and separately mounted upon bearings carried by said heater, louvers pivotally and separately mounted upon other bearings carried by said heater and arranged out of parallel with the bearings first mentioned, each of said louvers being independently adjustable, and means for insuring that each louver will remain at any adjusted position to which it is set.

22. An air deflector for a vehicle heater, including louvers pivotally and separately mounted upon independent bearings supported by said heater, the axes of at least two of the louvers being disposed in oblique relation to each other.

23. In an automotive vehicle heater a deflector including slotted side portions and a substantially vertical air arresting strip disposed at an intermediate portion of the heater between said side portions, each of said slotted side portions being adapted to cause air to travel away from the heater as divergent and downwardly directed sets of air currents, one set at either side of said strip.

HARRY ROSE.